United States Patent [19]

Hemphill et al.

[11] Patent Number: 5,218,537

[45] Date of Patent: Jun. 8, 1993

[54] SYSTEM AND METHOD FOR USING A COMPUTER TO GENERATE AND TEACH GRAMMAR LESSONS

[75] Inventors: Charles T. Hemphill, Coppell; Inderjeet Mani, Austin, both of Tex.

[73] Assignee: Texas Instruments Incorporated, Dallas, Tex.

[21] Appl. No.: 853,030

[22] Filed: Mar. 18, 1992

Related U.S. Application Data

[63] Continuation of Ser. No. 454,260, Dec. 21, 1989, abandoned.

[51] Int. Cl.⁵ .............................................. C06F 15/38
[52] U.S. Cl. ................................................... 364/419
[58] Field of Search ................ 364/419; 434/323, 327, 434/346, 335, 169

[56] References Cited

U.S. PATENT DOCUMENTS 4,804,828  2/1989  Barrabee ........................... 434/323
4,864,502  9/1989  Kucera et al. ...................... 364/419
4,968,257  11/1990  Yalen ................................. 364/419

OTHER PUBLICATIONS

"English: Basic Mechanics" Abstract from Microsearch File of Orbit, AN 86-036462, Aug. 1986.

*Primary Examiner*—Gail O. Hayes
*Attorney, Agent, or Firm*—Frank J. Kowalski; Leo N. Heiting; Richard L. Donaldson

[57] ABSTRACT

A grammar learning aid is implemented with a processor and read only memory programmed in a manner that minimizes memory space and maximizes effective teaching. The programming is based on a unification grammar, in which sentences are determined by their features. The programming is implemented with logic programming in which predicates represent data, and in which logic variables permit features to be unified. This feature-based grammar approach permits an erroneous answer to be associated with a feature and that feature used to generate a similar device.

19 Claims, 6 Drawing Sheets

Replace the underlined words with a pronoun:

Example:  Mary likes the dog.
          She likes the dog.

Problem:  John likes the dog.
          He ▓ likes the dog.

Correct!

```
1 2 3 4 5 6 7 8 9 0                HELP
! $ % & ( ) ' " + - * /            QUIT
Q W E R T Y U I O P                OFF
A S D F G H J K L ; :          ←    →
Z X C V B N M , . ?            ↓    ↑
    Shift    Space    Return
```

SYSTEM AND METHOD FOR USING A COMPUTER TO GENERATE AND TEACH GRAMMAR LESSONS

This application is a continuation of application Ser. No. 07/454,260, filed Dec. 21, 1989, now abandoned.

TECHNICAL FIELD OF THE INVENTION

This invention generally relates to electronic learning aids, and more particularly to a device for generating grammar exercises that are interactive with a user.

BACKGROUND OF THE INVENTION

With the advent of less expensive and smaller computer systems have come a number of electronic learning aids. The most common of these include math, spelling, and language translation aids. The most commercially successful of these devices are interactive, in the sense that they generate exercises and validate the user's response.

Distinguishing features of these learning aids are a small size, inexpensive price, and mass market appeal. They offer individual attention and self paced study. These features make them attractive to children and their parents on a broad scale. Typically, these devices operate as small digital devices, with inexpensive components for processing, memory, display, and user input.

Generally, the math learning aids use mathematic algorithms to calculate an answer, which is compared with the answer input by the user. Word learning aids, such as spelling and translation devices, use pre-stored exercises, which are read out of memory and compared with the user's answer.

In contrast to math and word exercises, grammar exercises are context dependent. Grammar, defined very generally as the study of the correct use of words in sentences, involves the relationship of words to each other. For most effective learning of grammar, the exercise should be presented as a sentence in which a part of speech, such as a pronoun or verb, is missing or incorrectly used. The user's role is to correct the sentence or supply the correct word.

The difficulty of generating effective grammar exercises is compounded by the need to teach the student how to extrapolate from the exercises to everyday use. This requires generating a variety of exercises. To pre-store a large number of exercises would require extensive memory.

As any good teacher knows, effective teaching avoids needless repetition that will cause the student to become bored. Two culprits are failing to vary the exercises and forcing a student to endure being drilled on what he or she already knows. Interactive learning aids attempt to provide variety by randomizing the items in a prestored list. Nevertheless, this type of randomization operates on a fixed number of exercises. Nor have electronic learning aids been generally successful in recognizing the needs of a particular student. Although artificial intelligence techniques are known that could provide such a feature, the programming demands for such a device have been prohibitive.

Thus, a need exists for an electronic grammar learning aid that is inexpensive to build and operate, and that will keep the interest of the student. The exercises should be interesting and permit the student to concentrate on those grammar rules with which he or she is weakest.

SUMMARY OF THE INVENTION

One aspect of the invention is a grammar learning aid having a processor, memory, display, and an input device. The memory is contains an interpreter that permits the processor to act on a stored set of grammar rules, a lexicon, and an exercise generator.

Another aspect of the invention is a method of using a computer as a grammar learning aid. The method comprises generating a grammar exercise, displaying the exercise on a display screen, accepting input from the user representing an answer to the exercise, evaluating the answer, and providing the results of the evaluation to the user.

A technical advantage of the invention is that a variety of grammar exercises are available to the user. The exercises are generated in response to the learning needs of the user. Yet, the programming requires very little memory space. As a result, the learning aid may be implemented in a small and inexpensive device.

DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

FIGS. 4a–4c illustrate the operation of the grammar learning aid from the user's point of view.

DETAILED DESCRIPTION OF THE INVENTION

Copyrighted Materials

A portion of the disclosure of this patent document contains material that is subject to copyright protection. The copyright owner has no objection to the facsimile reproduction by anyone of the patent disclosure, as it appears in the Patent and Trademark Office files or records, but otherwise reserves all copyright rights whatsoever.

Definitions

For purposes of this description, "exercises" are the fill-in-the-blank type questions promulgated to the user of the invention. "Lessons" are the specifications used to generate exercises, and, as explained below, may include prefatory output as well as feedback to the user.

System Hardware

Figure 1:
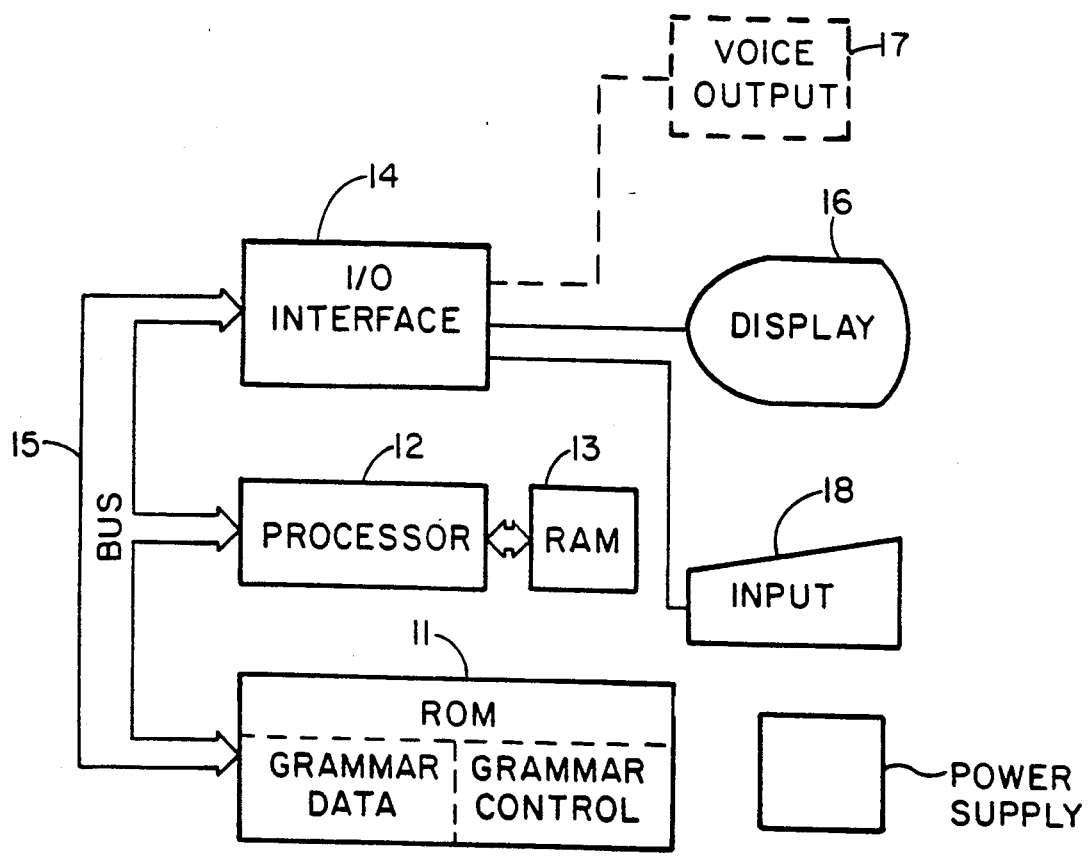
FIG. 1 is a block diagram of the components of an electronic grammar learning aid constructed in accordance with the invention.
Figure 2:
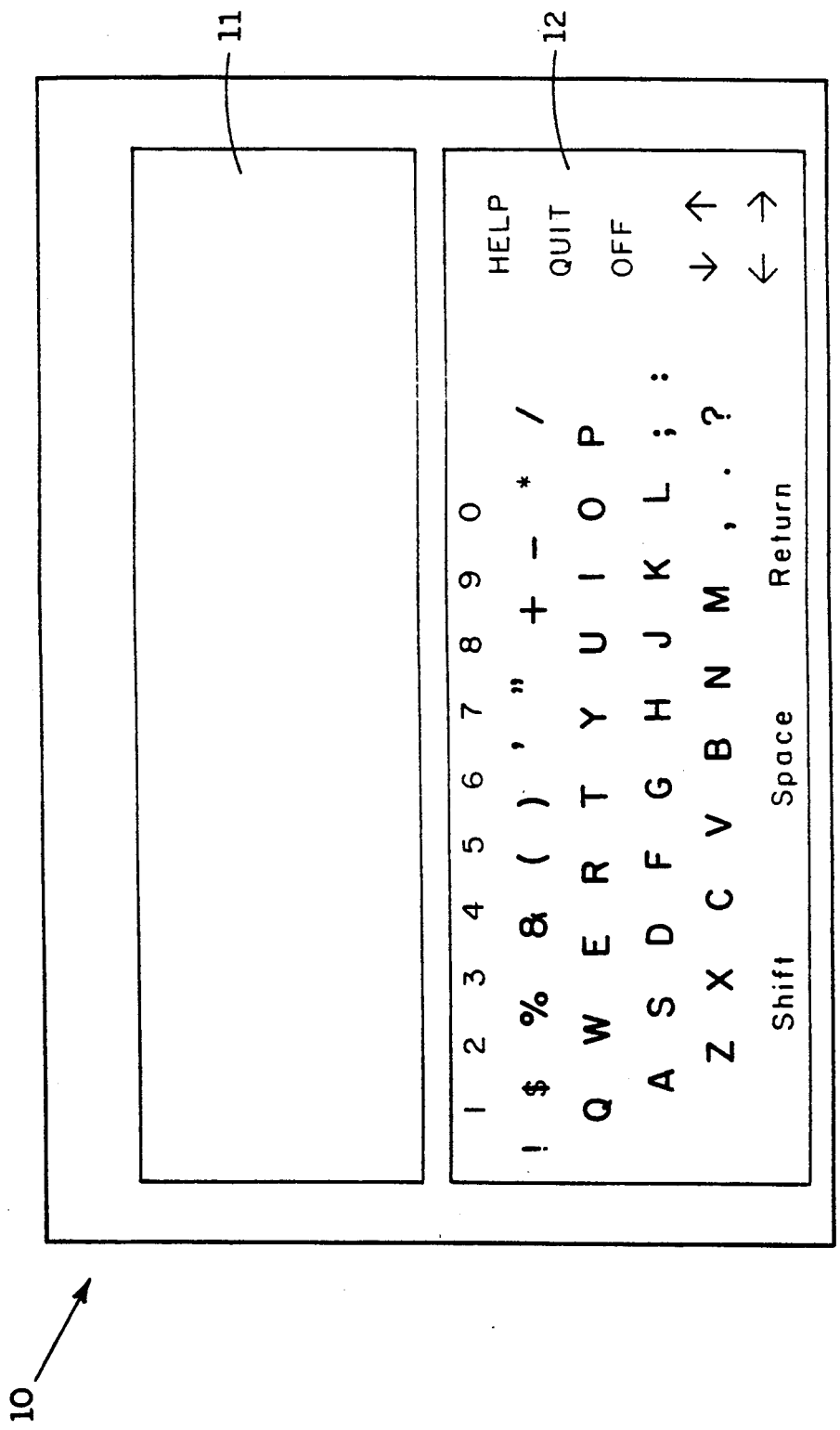
FIG. 2 is a perspective view of the front console of the grammar learning aid pictured in FIG. 1.

FIG. 1 is a block diagram of the various hardware components of one aspect of the invention, a grammar learning aid 10. In the embodiment of FIG. 1, the grammar learning aid 10 is a computer system having external peripheral devices. FIG. 2 illustrates the front console of another embodiment of the invention, in which the components are the functionally the same but are housed in a single hand held unit. As shown in FIGS. 1 and 2, the basic components of grammar learning aid 10 are: read only memory 11, processor 12, random access memory 13, an interface unit 14, a system bus 15, a display 16, an input device 18, and a power supply 19.

Read only memory (ROM) 11 contains data and instructions for generating grammar exercises. In the typical implementation of grammar learning aid 10, the allocation of ROM 11 is 20 Kbytes for grammar data ROM 11a and 12 Kbytes for grammar control ROM 11b. Optionally, ROM 11a may be one or more plug in modules for expanding the functionality of grammar learning aid 10. The particular manner in which ROM 11 is programmed is a basic feature of the invention, primarily because it minimizes memory requirements. Thus, ROM 11 is further explained in detail in connection with FIG. 3.

Processor 12 has the usual components, such as an arithmetic logic unit, control unit, and clock. Processor 12 may be a standard general purpose microprocessor, in which case the programming described below must be compiled or interpreted consistently with its instruction set. Alternatively, processor 12 may be a logic processor especially designed for the program language used for the invention, in particular PROLOG.

Random access memory (RAM) 13 is comprised of memory for performing the usual functions of RAM memory, such as accepting address and control inputs from processor 12. Depending on the state of the control input, RAM 13 accepts and stores the input data or it outputs previously stored data for use by processor 16. Typically, RAM 13 consists of 8 Kbytes, and because of the particular programming of the invention, is used for runtime stacks. RAM 13 may be easily implemented with any one of a number of commercially available integrated circuits, which may also include address decoders and buffers. To minimize space and power requirements of grammar learning aid 10, RAM 13 may be comprised of DRAM cells.

Interface unit 14 interfaces processor 12 to display 16 and input device 18, and may be designed using standard techniques for interfacing a processor to input and output devices. Interface 14 may also include device controllers for display 16 and input means 18.

Display 16 may be any one of a number of display types, including liquid crystal, video display, or light emitting diodes (LED). Physical specifications may dictate the type of display 16 used. For example, a liquid crystal display may be preferred for hand-held devices. A minimum of a 3 line by 60 character display is preferred if no scrolling is to be required. As indicated in FIG. 1, an alternative or supplement to display 16 is a voice output device 11a.

Input device 18 may be any input device that permits the user to select characters in combinations to form words. Preferably, input device also includes the various keys shown in FIG. 2, such as cursor keys, number keys, shift, space, and return keys, and specific function keys. Generally, input device 18 will be a keyboard, but other input techniques, such as voice recognition, may also be used. If a keyboard is used, it may be of the encoded type, in which grammar learning aid 10 has the on-board hardware necessary to detect which key is depressed. However, a non-encoded keyboard could also be used. Again, the design choices of input device 16 are a function of the desired size and cost of grammar learning aid 10.

Power supply 19 provides either AC or DC power. As indicated above, an advantage of the invention is that it may be implemented as a small low cost device, in which case it could easily be battery operated.

ROM Programming

An underlying premise of the invention is the use of computational linguistics as an approach to teaching grammar. This approach characterizes words and phrases according to their "features". Sentences are determined by a grammar that uses feature sets.

The invention combines this approach to teaching grammar with computer programming techniques. One such programming technique is using a computer to generate sentences of a natural language, such as English. Programming syntax rules, referred to as phrase structure rules, are used for this purpose. An example of a simple context free phrase structure rule is:

s→np vp

, which means that a sentence structure, s, can consist of a noun phrase, np, followed by a verb phrase, vp. Noun phrases consist of determiners, d, articles and adjectives, and a noun, n. Verb phrases can consist of verbs, v, plus sentence structures, s. Other forms of phrase structure rules incorporate mechanisms for encoding context. In a definite clause grammar, for example, symbols such as s, np, and vp, can have arguments, which can be used to handle such matters as noun-verb agreement.

One type of programming language well suited for generating sentences is logic programming, implemented in languages such as PROLOG. Logical variables permit variables to be assigned to variables. A backward chaining capability can be used to generate and parse generate sentences. A unification process determines useful values for variables. For purposes of the invention, although other programming languages could be used, the important programming language characteristics are the use of logical variables, unification as a variable assigning strategy, and backtracking as a control strategy.

Referring again to FIG. 1, the overall architecture of ROM 11 divides its programming into two parts: grammar data ROM 11a and grammar control ROM 11b. The following description refers to Attachments A-G, which are listings of a PROLOG implementation of ROM 11. In the Attachments, as is standard in PROLOG, upper case characters make up variable names, unless in quotes. Lower case characters are constants. In the following description, bracketed letters representing the Attachments and numbers representing lines of code in the Attachments are used to illustrate program code. It is to be understood that the examples of Attachments A-G are illustrative, and a fully implemented grammar learning aid 10 could have substantially expanded grammar data and control code.

Figure 3:
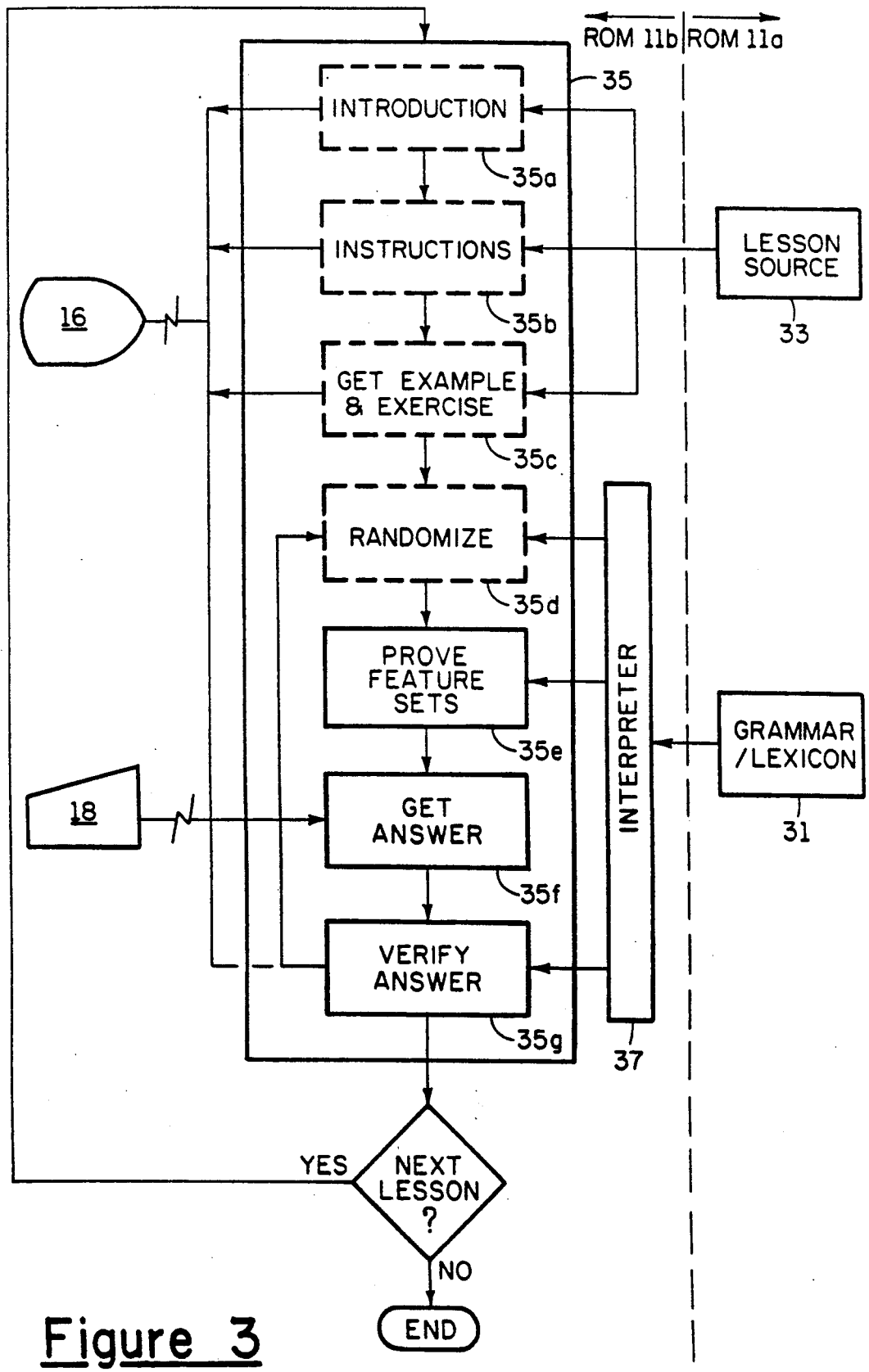
FIG. 3 is a data and process diagram of the ROM programming of the grammar learning aid of FIGS. 1 and 2.

FIG. 3 illustrates the contents of ROM 11, and is in the nature of a data flow diagram. FIG. 3 explicitly shows four functional modules: a grammar/lexicon 31, a lesson source 33, a control process 35, and interpreter 37. Referring now to Attachments A-D, each of these modules is represented by programming examples: Attachment A is grammar/lexicon 31, Attachment B is lesson source 33, Attachment C is control process 35, and Attachment D is interpreter 37.

As an overview of the functions of the four modules of FIG. 3, grammar/lexicon 31 defines sentences, phrases, and words in terms of features. Control process 35 relates grammar/lexicon 31 to lesson source 33 to provide lessons, and in doing so, determines what exercise to generate and how to randomize features. Control process 35 uses interpreter 37 to unify and prove features.

In general, because of the characteristics of logic programming, grammar/lexicon 31 and lesson source 33 may be thought of as "data", in that they are operated on by system and control programming. For this reason, ROM 11a may be comprised of plug-in memory modules for grammar/lexicon 31 and lesson source 33, thereby permitting a wide variety of interchangeable lessons to be provided. On the other hand, control process 35 and interpreter 37 are system and control processes that access grammar/lexicon 31 and lesson source 33. These modules, together with other system and control programming discussed below, are the programming of grammar control ROM 11b.

Grammar/lexicon 31 has two parts: a grammar and a lexicon. The grammar contains a set of grammar rules, which can be a set consisting of a wide variety of rules. Examples are rules for using pronouns, articles, or verb tenses. The lexicon allows the capability to both generate and parse sentences. When a new exercise is to be generated and displayed, a correct sentence is generated and then parsed so that a blank or incorrect word can be substituted for a correct word. The fill-in-the-blank or the incorrect sentence is then displayed on display 16.

Grammar/lexicon 31 is constructed in accordance with a basic concept of the invention: describing sentences in terms of features and grammar as a set of rules, and using the unification procedures of PROLOG to generate sentences from features and to associate features and rules. This grammar approach is referred to herein and in the accompanying programming examples as a feature set grammar.

Attachment A is an example of a small sample grammar, designed for teaching the use of pronouns and verbs [lines A8-A13]. It has five grammar rules, which use the functor, +, to symbolize feature set unification. The colons designate feature-value pairs. The operators, →, :---, and [':'], are defined in an interpreter, which is discussed below.

As an example, for the first grammar rule, a sentence, s, has a noun phrase, NP, and verb phrase, VP, each with a set of feature-value pairs [lines A8-A9]. Agreement is a feature set of the subject that unifies with a feature set of the verb [line A8].

Following the grammar portion of Attachment A, is the lexicon portion of grammar/lexicon 31 [lines A14-A153]. The lexicon is divided into descriptions of features for a number of parts of speech, such as: determiners, nouns, verbs, and pronouns. Accompanying each type are a list of words to be inserted in the exercises. Alternatively, to conserve memory, rather than a list, pointers to a number of choices in another memory area could be used. This permits external memory devices such as plug in memory modules to be used with the invention.

As an example of how sentences are defined in terms of features, each pronoun in Attachment A is defined by a predicate. [lines A69-A153]. Each pronoun has an agreement feature, which includes its syntactic case as determined by whether the pronoun is in the subject or object position of a sentence.

As an example of applying unification to the teaching of pronouns, consider the sentence, "Tom saw him and me." The noun phrase requires the feature pair "case: objective" [line A10]. The pronoun "me" has an objective case [lines A71-A72].

Lesson source 33 contains the data required to generate five parts of a grammar lesson: the introduction, instructions, an example, the exercise, and the solution.

Attachment B is an example of a lesson source that would accompany the grammar of Attachment A. Attachment B provides five lessons, each for teaching one of five grammar subjects: identification of parts of speech (pos) [lines B4-B20], subject pronouns, [lines B21-B37]personal object pronouns [lines B38-B57], verb agreement [lines B58-B74], and reflexive object pronouns [lines B75-B96]. A particular lesson is referred to as the variable Lesson in other parts of the programming.

As an example of a lesson, the lesson for teaching subject pronouns provides a list of pronouns [lines B21-B37]. As explained below in connection with FIG. 3, the features are provided to control process 35, which generates a sentence with those features and a particular feature under change. As with the grammar/lexicon 31, to permit an expanded set of lessons and to conserve memory, pointers to a list could be provided in lieu of a list.

Control process 35 governs the generation of, and response to, exercises put to the user. FIG. 3 is also a flow diagram of the steps of control process 35, where steps 35a-35g illustrate the process of using a computer to generate a lesson. FIG. 3 is best understood with reference to Attachment C, which is an example of a control process 35 used with the grammar/lexicon 31 and the lesson source 33 of Attachments A and B.

Control process 35 is repetitive, providing the ability to generate a next lesson after the present lesson [lines C1-C2]. The present lesson is chosen from a list of lessons. After each lesson is run, a status indicator indicates whether a next lesson will be generated, and its type. As explained below, the type of the next lesson can be a function of the results of the present lesson.

Referring now to FIG. 3, step 35a for each lesson is generating and displaying an introduction. The contents of the introduction are obtained from lesson source 33 [lines C5-C6]. Step 35a includes programming, i.e., update_display, that sends a character string to display 16.

Step 35b is generating and displaying instructions, which are also obtained from lesson source 33 [lines C7-C8]. Step 35b also includes update_display for sending a character string to display 16.

Step 35c is generating the exercise, and optionally, a corresponding example. This step is implemented as a predicate, generate_exercise, in Attachment C [lines C12-C21]. If desired, an example is obtained from lesson source 33 and displayed [lines C13-C14]. The exercise itself is generated, using a predicate, exercise, which has the following arguments: Lesson, QuFS, QuBlFS, AnsSymB, and Rfeatures [line C15]. Lesson represents a lesson from lesson source 33. The next two arguments, QuFS and QuBlFS, deal with feature sets and refer to a question feature set and a question blank feature set, respectively. AnsSymb represents a part of the sentence that is the focus of the exercise. Rfeatures represents the features of the user's answer.

Step 35d of control process 35 is a randomization step that uses Rfeatures. Rfeatures is a byproduct of the previous lesson and indicates those features that are to be the subject of the next lesson. Attachment E sets out an example of randomization step 35d [lines E8-E18]. Randomization step 35d permits the invention to generate many sentences from the sentence components provided in lesson source 33. Because of this randomization feature, the number of sentences that can be generated is greater than if individual sentences were stored. In fact, the rules of the grammar of grammar/lexicon 31 can enable the language to be theoretically infinite. For example, assuming that a sentence requires three parts, i.e., a subject, verb, and object, and n sets of three components are provided, the number of sentences that can be generated is on the order of $n^3$. Thus, if three nouns, three verbs, and three objects are provided, they can be combined for a potential 27 sentences.

An additional feature of randomization step 35d is that Rfeatures can be used to generate a sentence with a certain feature. For example, if in the previous lesson, the user incorrectly used the pronoun in the objective case, that fact is represented by Rfeatures and affects randomization step 35d so that it favors selection of an exercise having the same feature.

The remaining steps of control process 35 involve the unification and logic aspects of the invention. To implement these steps, control process 35 calls feature set prove routines in interpreter 37, as well as a special feature set unification routine. All of these prove and unification routines are part of ROM 11b.

Interpreter 37 is actually a meta interpreter, in that it interprets the feature set grammar of grammar/lexicon 31 and lesson source 33, rather than the PROLOG code itself. This difference is explained below in connection with the compiled versus interpreted embodiments of the invention. Consistent with logic programming techniques, interpreter 35 uses backtracking to prove goals by accessing grammar/lexicon 31 and lesson source 33. Because the invention is oriented to manipulation of sentences in terms of grammatically correct feature sets, interpreter 35 has a routine fsg_grove, which is called by control process 35 in steps 35e and 35g, to provide this proof. Attachment D is an example of interpreter 35.

A feature set unification routine, called by control process 35, as well as by interpreter 37, unifies two feature sets. To generate an exercise, a desired feature set is unified with a feature set in grammar/lexicon 31. To verify an answer, a feature set representing the sentence with the user's answer is unified with the feature set of the correct sentence. Attachment F is an example of this unification routine.

Referring now to step 35e of FIG. 3, control process 35 requests a set of correctly assembled words corresponding to a set of features. Control process 35 provides a question feature set, QuFS, to interpreter 37 and receives a correct sentence [line C19]. As explained above, control process calls fsg_prove in interpreter 37 for this purpose. As an example of using fsg_prove, interpreter 37 looks for a grammar rule having the same feature as a feature to be unified [line D9]. Once a goal value and a head value are unified, interpreter 37 attempts to prove the body [lines D10-D11].

After an exercise is generated, step 35e includes parsing the sentence to form a subset of the sentence, which has a missing word. Control process 35 provides a question blank feature set, QuBlFS, in which a blank is substituted for the feature that is the subject of the exercise, and receives the exercise to be output to the user on display 16 [line C20]. This sentence subset is displayed to the user on display 16.

Step 35f is receiving an answer phrase from the user line C10]. This answer is input via input means 18, as explained above in connection with FIGS. 1 and 2. The answer phrase is represented in Attachment C as Answer_phrase.

Step 35g is verifying the answer received in step 35e. This step is implemented as a predicate, verify—answer [lines C22-C62]. The basic function of verify_answer is to compare the sentence having the user-provided answer with the correct sentence generated in step 35c. The arguments of verify_answer are the lesson from step 35c, Answer_phrase from step 35d, AnsSymb from step 35c, and status data. In step 35g, control process 35 substitutes the user's answer into the exercise to determine whether it parses through the correctly assembled features. As does generate_exercise, verify_answer uses the fsg_prove routine of interpreter 35 to provide this proof.

An advantage of step 35g, as implemented in Attachment C, is that the nature of the error is diagnosed. Also, the user is told not only whether the answer is incorrect, but whether the answer is close, or whether he or she should try again. The latter message is delivered when the error is not diagnosed.

Step 35g provides additional feedback to the user by providing the nature of an error. If the user has incorrectly entered an objective pronoun in the subject of a sentence, the programming recognizes that the feature in the user's answer does not match a feature of the correct sentence. For example, if the user has entered, "Jennifer and me like Brandon", control process 35 recognizes that "me" has a feature of being objective, whereas the correct word "I" has the feature of being subjective. An error message is generated and displayed on display 16 to inform the user of the nature of the error. The routine element_diff in an example of programming for implementing this step [lines C48-C62]. The feature of the user's wrong answer can also be used as input to randomization step 35d, as discussed above.

After the lesson is verified, control process 35 generates another lesson. This cycle continues for either a predetermined set of lessons or until the user desires to quit.

In addition to the control programming of ROM 11b described above, ROM 11b may contain programming for executing a compiled form of a higher level logic program. Various implementations of the invention may call for either compilation or interpretation of the source code. For implementations in which memory space is to be minimized, the preferred embodiment of the invention uses an interpreter. In other implementations of the invention, where speed of execution is the primary consideration, the PROLOG source code could be compiled into code for a virtual PROLOG machine.

In preferred embodiment, in which small memory space is desired, a C interpreter is written for PROLOG and compiled to ROM 11b. The result is a host hardware interpreter for the PROLOG code. Memory is minimized because the grammar lesson programming need not be compiled, which eliminates the need for space for compiled code. Attachment G set out a routine that is used at load time by the PROLOG interpreter to preprocess the feature sets into a form suitable for use by the feature set unification predicates.

Operation of the Invention

Figure 4A:
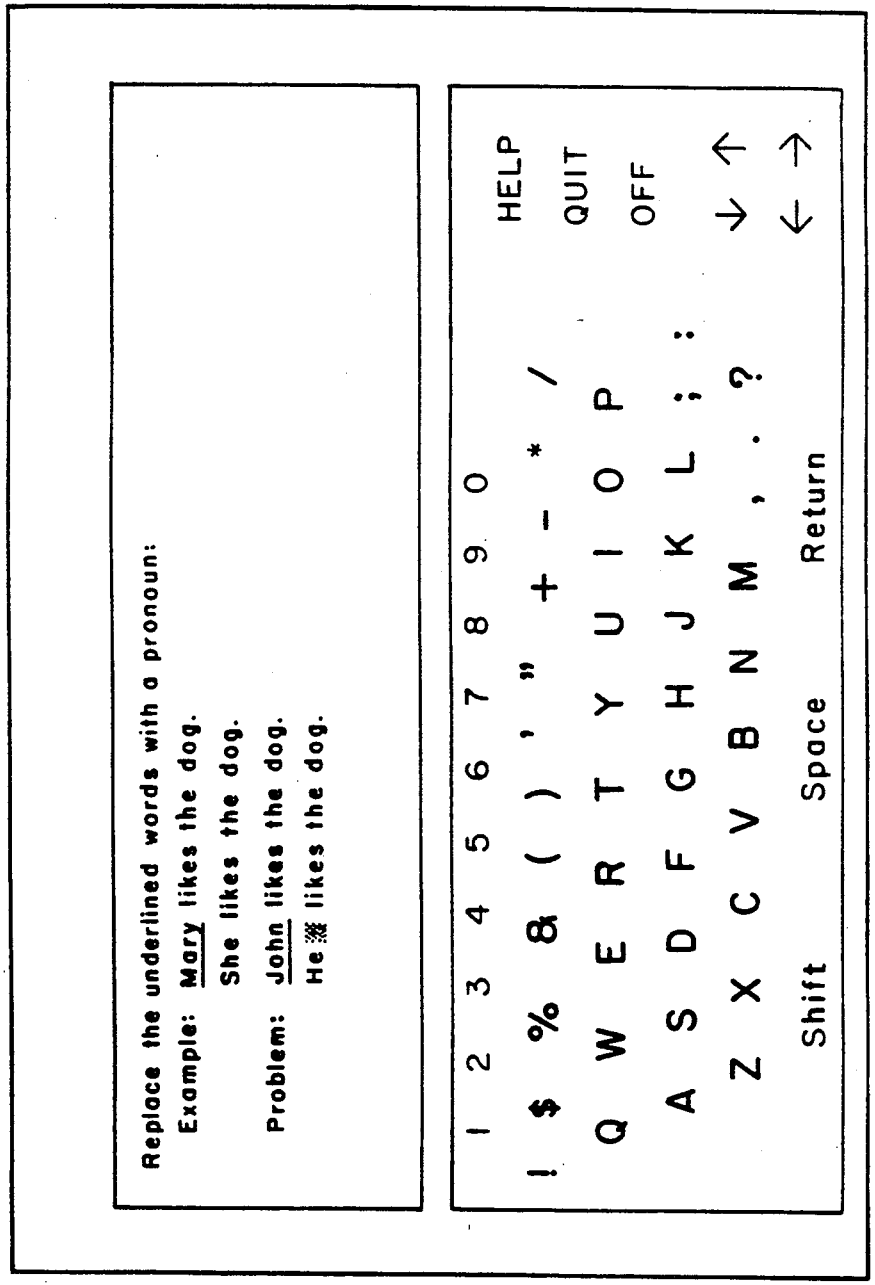
Figure 4C:
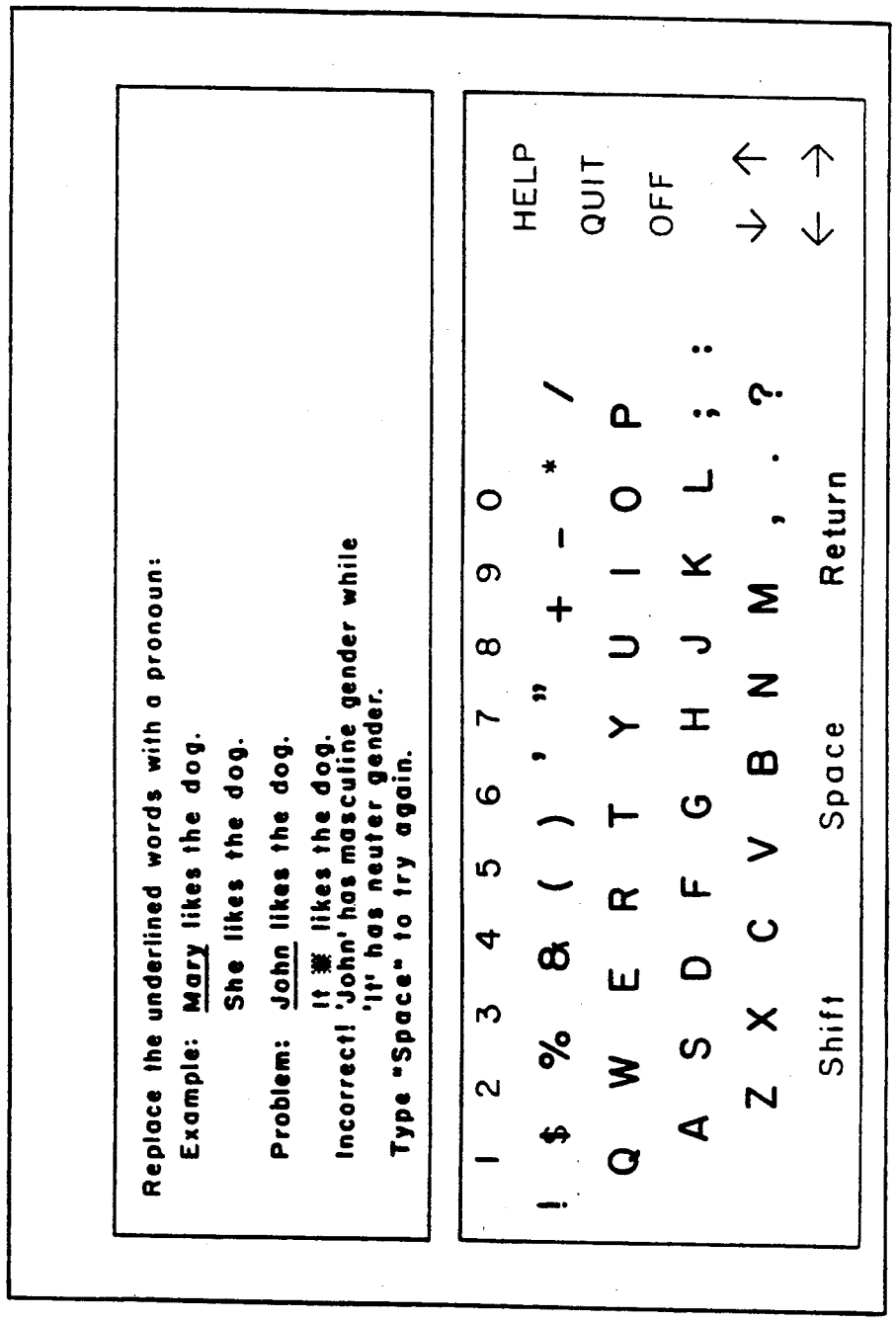

FIGS. 4*1*–4*c* illustrate an example of the operation of the invention. The example teaches the use of pronouns in the subject of a sentence. In FIG. 4a, the user is prompted to substitute a pronoun in the subject of the sentence, "John likes the dog." The underlined portion indicated the word to be substituted, which the user has entered as "He". In FIG. 4b, grammar learning aid 10 has verified the answer, and found it to be correct. The work "Correct" provides feedback tot he user. However, in FIG. 4c, the user has entered "It", rather than "He". Grammar learning aid 10 has found this answer to be incorrect, and has given an appropriate message to the user. In addition to simply stating that the answer is incorrect, grammar learning aid 10 has determined the features of "it" that causes it to be incorrect and has so informed the user.

Other Embodiments

Although the invention has been described with reference to specific embodiments, this description is not meant to be construed in a limiting sense. Various modifications of the disclosed embodiment, as well as alternative embodiments of the invention will become apparent to persons skilled in the are upon reference to the description. It is, therefore, contemplated that the appended claims will cover such modifications that fall within the true scope of the invention.

```
1   %  -*- Mode:Prolog; Fonts: (MEDFNT HL12BI) -*-
2   feature_order((role:_)) :- true.

3   terminal_class(determiner, W, determiner:(spec:W)) :- true.
4   terminal_class(noun, W, noun:(lex:W)) :- true.
5   terminal_class(verb, W, verb:(lex:W)) :- true.
6   terminal_class(pronoun, W, pronoun:(lex:W)) :- true.

7   feature_order((role:_, case:_, 'pronoun-type':_, number:_, person:_)) :- true.

8   s:VP+(agreement:A, subject:NP+(role:subject, agreement:A+(case:subjective))) ---> np:NP,
9       vp:VP.

10  vp:V+(object:NP+(role:object, agreement:(case:objective))) ---> verb:V, np:NP.

11  np:D+N+(type:common) ---> determiner:D, noun:N.

12  np:N+(type:proper) ---> noun:N.

13  np:P+(type:pronoun, function:np) ---> pronoun:P.

14  determiner:(spec:the, agreement:(count:'-', definite:'+')) :-- true.
15  determiner:(spec:a, agreement:(number:singular, count:'+', definite:'-',
16      sound:consonant)) :-- true.
17  determiner:(spec:an, agreement:(number:singular, count:'+', definite:'-', sound:vowel))
18      :-- true.

19  noun:(lex:Any, stem:Any, any:B) :--- nonvar(B), !.

20  noun:(lex:Stem, stem:Stem, type:proper, agreement:(number:singular, person:third,
21      gender:Gender)) :---
22      select_choice(Stem, [Gender:[masculine, feminine])).
23  proper_stem(Gender, Stem).

24  noun:(lex:Lex, stem:Stem, type:common,

Attachment A (1 of 5)
            Copyright 1987 Texas Instruments, Inc.

25  agreement:(number:Number, person:third, gender:Gender, sound:Sound)) :---
26  select_choice(Lex, [Number:[singular, plural],
27      Gender:[neuter, feminine, masculine, neuter])),
28  common_stem(Gender, Stem, Lex),
29  number(Number, Stem, Lex),
```

```
30    sound(Sound, Lex).

31    proper_stem(feminine, Stem) :-
32        select_choice(Stem, [Stem:['Denise', 'Heather', 'Mary', 'Susan']]).
33    proper_stem(masculine, Stem) :-
34        select_choice(Stem, [Stem:['Doug', 'John', 'Justin', 'Scott']]).

35    common_stem(feminine, Stem, Lex) :-
36        select_choice(Lex, [Stem:[queen, girl, princess]]).
37    common_stem(masculine, Stem, Lex) :-
38        select_choice(Lex, [Stem:[king, boy, prince, clown]]).
39    common_stem(neuter, Stem, Lex) :-
40        select_choice(Lex, [Stem:[frog, eagle, dog, mouse, lion, cat, aardvark, tiger]]).

41    verb:(lex:Any, stem:Any, any:B) :--- nonvar(B), !.

42    verb:(lex:Lex, stem:Stem, agreement:(number:Number, person:Person), tense:present,
43          transitive:'+') :---
44        var(Lex),
45        randomize_features([Stem:[like, see, bite, find, chase, catch],
46                            Number:[singular, plural],
47                            Person:[first, second, third]]),
48        number(Number, Person, Stem, Lex).
49    verb:(lex:Lex, stem:Stem, agreement:(number:Number, person:Person), tense:present,
50          transitive:'+') :---
51        nonvar(Lex),
52        member(Stem, [like, see, bite, find, chase, catch]),
53        member(Number, [singular, plural]),
54        member(Person, [first, second, third]),
55        number(Number, Person, Stem, Lex).

56    % `F1`pronoun-type` is personal, reflexive, or possessive`F*

57    pronoun:(lex:Any, stem:Any, any:B) :--- nonvar(B), !.

58    pronoun:P+(lex:Lex, agreement:(person:Person, number:Number, gender:Gender)) :---
59        var(Lex),
60        randomize_features([Person:[first, second, third],
61                            Number:[singular, plural],
62                            Gender:[masculine, feminine, neuter]]),
63        a_pronoun:AP,
```

```
64      fset_unify(P, AP).

65      pronoun:P+(lex:Lex) :--
66          nonvar(Lex),
67          a_pronoun:AP,
68          fset_unify(P, AP).

69      a_pronoun:(lex:'I', stem:pro, type:pronoun, 'pronoun-type':personal,
70          agreement:(case:subjective, number:singular, person:first)) ::- true.
71      a_pronoun:(lex:me, stem:pro, type:pronoun, 'pronoun-type':personal,
72          agreement:(case:objective, number:singular, person: first)) ::- true.
73      a_pronoun:(lex:myself, stem:pro, type:pronoun, 'pronoun-type':reflexive,
74          agreement:(case:objective, number:singular, person:first)) ::- true.
75      a_pronoun:(lex:my,      stem:pro,    type:pronoun,      'pronoun-type':possessive,
76      function:determiner,
77          agreement:(number:singular, person:first)) ::- true.
78      a_pronoun:(lex:mine,    stem:pro,    type:pronoun,     'pronoun-type':possessive,
79      function:nominal,
80          agreement:(number:singular, person:first)) ::- true.

81      a_pronoun:(lex:we, stem:pro, type:pronoun, 'pronoun-type':personal,
82          agreement:(case:subjective, number:plural, person:first)) ::- true.
83      a_pronoun:(lex:us, stem:pro, type:pronoun, 'pronoun-type':personal,
84          agreement:(case:objective, number:plural, person: first)) ::- true.
85      a_pronoun:(lex:ourselves, stem:pro, type:pronoun, 'pronoun-type':reflexive,
86          agreement:(case:objective, number:plural, person:first)) ::- true.

Attachment A (3 of 5)
             Copyright 1987 Texas Instruments, Inc.

87      a_pronoun:(lex:our,     stem:pro,     type:pronoun,      'pronoun-type':possessive,
88      function:determiner,
89          agreement:(number:plural, person:first)) ::- true.
90      a_pronoun:(lex:ours,    stem:pro,     type:pronoun,      'pronoun-type':possessive,
91      function:nominal,
92          agreement:(number:plural, person:first)) ::- true.

93      a_pronoun:(lex:you, stem:pro, type:pronoun, 'pronoun-type':personal,
94          agreement:(person:second)) ::- true.
95      a_pronoun:(lex:yourself, stem:pro, type:pronoun, 'pronoun-type':reflexive,
96          agreement:(case:objective, number:singular, person:second)) ::- true.
97      a_pronoun:(lex:your,    stem:pro,    type:pronoun,      'pronoun-type':possessive,
98      function:determiner,
99          agreement:(number:singular, person:second)) ::- true.
100     a_pronoun:(lex:yours,   stem:pro,    type:pronoun,      'pronoun-type':possessive,
101     function:nominal,
```

```
102        agreement:(number:singular, person:second)) :- true.

103   a_pronoun:(lex:yourselves, stem:pro, type:pronoun, 'pronoun-type':reflexive,
104        agreement:(case:objective, number:plural, person:second)) :- true.

105   a_pronoun:(lex:he, stem:pro, type:pronoun, 'pronoun-type':personal,
106        agreement:(case:subjective, number:singular, person:third, gender:masculine))
107        :- true.
108   a_pronoun:(lex:him, stem:pro, type:pronoun, 'pronoun-type':personal,
109        agreement:(case:objective, number:singular, person:third, gender:masculine))
110        :- true.
111   a_pronoun:(lex:himself, stem:pro, type:pronoun, 'pronoun-type':reflexive,
112        agreement:(case:objective, number:singular, person:third, gender:masculine))
113        :- true.
114   a_pronoun:(lex:his,       stem:pro,      type:pronoun,      'pronoun-type':possessive,
115   function:determiner,
116        agreement:(number:singular, person:third, gender:masculine)) :- true.
117   a_pronoun:(lex:his, stem:pro, type:pronoun, 'pronoun-type':possessive, function:nominal,
118        agreement:(number:singular, person:third, gender:masculine)) :- true.

Attachment A (4 of 5)
                  Copyright 1987 Texas Instruments, Inc.

119   a_pronoun:(lex:she, stem:pro, type:pronoun, 'pronoun-type':personal,
120        agreement:(case:subjective, number:singular, person:third, gender:feminine))
121        :- true.
122   a_pronoun:(lex:her, stem:pro, type:pronoun, 'pronoun-type':personal,
123        agreement:(case:objective, number:singular, person:third, gender:feminine))
124        :- true.
125   a_pronoun:(lex:herself, stem:pro, type:pronoun, 'pronoun-type':reflexive,
126        agreement:(case:objective, number:singular, person:third, gender:feminine))
127        :- true.
128   a_pronoun:(lex:her,       stem:pro,      type:pronoun,      'pronoun-type':possessive,
129   function:determiner,
130        agreement:(number:singular, person:third, gender:feminine)) :- true.
131   a_pronoun:(lex:hers,      stem:pro,      type:pronoun,      'pronoun-type':possessive,
132   function:nominal,
133        agreement:(number:singular, person:third, gender:feminine)) :- true.
134   a_pronoun:(lex:it, stem:pro, type:pronoun, 'pronoun-type':personal,
135        agreement:(number:singular, person:third, gender:neuter)) :- true.
136   a_pronoun:(lex:itself, stem:pro, type:pronoun, 'pronoun-type':reflexive,
137        agreement:(case:objective, number:singular, person:third, gender:neuter))
138        :- true.
139   a_pronoun:(lex:its,       stem:pro,      type:pronoun,      'pronoun-type':possessive,
140   function:determiner,
```

```
141         agreement:(number:singular, person:third, gender:neuter)) :- true.
142 a_pronoun:(lex:they, stem:pro, type:pronoun, 'pronoun-type':personal,
143         agreement:(case:subjective, number:plural, person:third)) :- true.
144 a_pronoun:(lex:them, stem:pro, type:pronoun, 'pronoun-type':personal,
145         agreement:(case:objective, number:plural, person: third)) :- true.
146 a_pronoun:(lex:themselves, stem:pro, type:pronoun, 'pronoun-type':reflexive,
147         agreement:(case:objective, number:plural, person:third)) :- true.
148 a_pronoun:(lex:their, stem:pro, type:pronoun, 'pronoun-type':possessive,
149 function:determiner,
150         agreement:(number:plural, person:third)) :- true.
151 a_pronoun:(lex:theirs, stem:pro, type:pronoun, 'pronoun-type':possessive,
152 function:nominal,
153         agreement:(number:plural, person:third)) :- true.

Attachment A (5 of 5)
                    Copyright 1987 Texas Instruments, Inc.

1   %-*- Mode:Prolog -*-

2   lesson(L) :- repeat, member(L, [subject_pronoun, personal_object_pronoun, subject_verb,
3   reflexive_object_pronoun, p_o_s]).

4   introduction(p_o_s,
5       [['Remember', the, 'subject',',', 'verb',',', and, object, of, the, 'sentence?'],
6        ['Let''s', identify, these, different, parts, of, the, 'sentence.']]).
7   instructions(p_o_s,
8       [['Pick', out, the, 'subject',',', 'verb',',', or, 'object',', in, the, sentence, below]]).
9   example(p_o_s, ['The',clowns,love,'Jennifer'], ['The', object, is, 'Jennifer']).
10  exercise(p_o_s,
11      s:(lex:Vlex,
12         subject:(lex:Slex, type:Stype),
13         object:(lex:Olex, type:Otype)),
14      s:(stem:Z, any:true, subject:(stem:Z, any:true, type:common, number:singular),
15                            object:(stem:'', type:proper, any:true)),
16      X:(lex:Y, role:Z),
17      [Stype:[common, proper], Otype:[common, proper],
18      [X,Y,Z]:[[noun, Slex, subject], [verb, Vlex, verb], [noun, Olex, object]]] :-
19      true.
20  solution(p_o_s, noun:A, A) :- true.
21  solution(p_o_s, verb:A, A) :- true.

22  introduction(subject_pronoun,
23      [['Let''s', use, pronouns, in, the, subjective, 'case.'],
24       ['The', 'sentence''s', subject, is, in, the, subjective, 'case.'],
```

```
25      ['Pronouns', which, can, occur, in, the, subjective, case, 'are:'],
26      [' "I",', ' "you",', ' "he",', ' "she",', ' "it",', ' "we",', ' "they".' ]]).
27  instructions(subject_pronoun,
28      [['Replace', the, subject, with, a, pronoun]]).
29  example(subject_pronoun, ['Jennifer', likes, 'Brandon'],
30                           ['She', likes, 'Brandon']).
31  exercise(subject_pronoun,
32      s:(stem:Stem, lex:Lex, agreement:A, subject:('pronoun-type':null, type:Stype, 33
33      agreement:SA), object:O+(type:Otype)), Attachment B (1 of 3)
                Copyright 1987 Texas Instruments, Inc.

35      s:(stem:Stem, lex:Lex, agreement:A, subject:(type:proper, stem:'      ', any:true),
36      object:O),
37      np:(stem:pro, type:pronoun, 'pronoun-type':personal, agreement:SA),
38      [Stype:[common, proper, common], Otype:[common, proper, pronoun, common]]) :- true.
39  solution(subject_pronoun, np:(agreement:A), A) :- true.

40  introduction(personal_object_pronoun,
41      [['Let''s', now, use, pronouns, in, the, objective, 'case.'],
42      ['The', 'sentence''s', object, is, in, the, objective, 'case.', 'Pronouns'],
43      [have, different, forms, in, the, subjective, and, objective, 'cases:'],
44      [' "I"', in, the, subjective, case, becomes, ' "me"', in, the, objective, 'case.'],
45      [' "He"', becomes, ' "him",', ' "she"', becomes, ' "her",', and, ' "we"', becomes,
46       ' "us".'],
47      [' "They"', becomes, ' "them".'],
48      ['Only', ' "you"', and, ' "it"', do, not, change, in, the, two, 'cases.']]).
49  instructions(personal_object_pronoun,
50      [['Replace', the, object, with, a, personal, pronoun]]).
51  example(personal_object_pronoun, ['Jennifer', likes, 'Brandon'],
52                                   ['Jennifer', likes, him]).
53  exercise(personal_object_pronoun,
54      s:(stem:Stem, lex:Lex, agreement:A, subject:S+(type:Stype),
55      object:('pronoun-type':null, type:Otype, agreement:OA)),
56      s:(stem:Stem, lex:Lex, agreement:A, subject:S, object:(type:proper, stem:'
57      ', any:true)),
58      np:(stem:pro, type:pronoun, 'pronoun-type':pronoun],
59      [Stype:[common, proper, pronoun], Otype:[common, proper]]) :- true.
60  solution(personal_object_pronoun, np:(agreement:A), A) :- true.

61  introduction(subject_verb,
62      [['The', verb, in, a, sentence, must, always, agree, with, the, 'subject.'],
63      ['If', the, subject, is, singular, the, verb, is, 'singular.'],
64      ['If', the, subject, is, plural, the, verb, is, 'plural.']]).
65  instructions(subject_verb,       % Finites agree in number and person with their
```

```
66                                              % subjects, non-finites don't.
67      [['Use', the, correct, form, of, the, following, verb]].
68   example(subject_verb, ['Like'], ['Jennifer', likes, milk]).

Attachment B (2 of 3)
                       Copyright 1987 Texas Instruments, Inc.

69   exercise(subject_verb,
70      verb:(stem:Stem, lex:Stem, agreement:(number:plural, person:first)),
71      s:(stem:'        ', any:true,
72         subject:(type:Stype, agreement:SA+(definite:'+')),
73         object:(type:Otype, 'pronoun-type':personal)),
74      verb:(stem:Stem, agreement:SA),
75      [Stype:[common, proper, pronoun], Otype:[common, proper, pronoun]]) :- true.
76   solution(subject_verb, verb:(agreement:A), A) :- true.

77   introduction(reflexive_object_pronoun,
78      [['Let''s', learn, about, reflexive, 'pronouns.'],
79       ['Reflexive', pronouns, 'are:'],
80       [ '  "myself",', ' "yourself",', ' "himself",', ' "herself",' ],
81       [ '  "itself",', ' "ourselves",', ' "yourselves",', ' "themselves".' ],
82       ['Reflexive', pronouns, are, always, in, the, objective, 'case.'],
83       ['They', are, used, when, the, 'sentence''s', object, refers, to, the, same,
84          thing], [as, the, 'sentence''s', 'subject.']]).
85   instructions(reflexive_object_pronoun,
86      [['Replace', the, object, with, a, reflexive, pronoun]]).
87   example(reflexive_object_pronoun, ['Jennifer', likes, '       '], ['Jennifer', likes,
         herself]).
88   exercise(reflexive_object_pronoun,
89      noun:(stem:'       ', any:true),
90      s:(stem:Stem, lex:Lex, agreement:A,
91         subject:S+(type:Stype, agreement:(gender:Gender, number:Number)),
92         object:(stem:'      ', type:pronoun, any:true)),
93      np:(stem:pro, type:pronoun, 'pronoun-type':reflexive,
94         agreement:(gender:Gender, number:Number, person:Person, case:objective)),
95      [Stype:[common, proper, pronoun]]) :- true.
96   solution(reflexive_object_pronoun, np:('pronoun-type':PT, agreement:P), P) :-
97      fset_unify(P, ('pronoun-type':PT)).

Attachment B (3 of 3)
                       Copyright 1987 Texas Instruments, Inc.

%-*- Mode:Prolog; Fonts:(MEDFNT HL12BI) -*-

1    eagle :- lesson(Lesson), next_lesson(Lesson, Status), Status = [0,0].
```

```
 2  next_lesson(Lesson, Status) :- run_lesson(Lesson, Status), Status = [0,_], !.

3  run_lesson(Lesson, Status) :-
 4      clear_display,
 5      introduction(Lesson,Intro),
 6      update_display(introduction, Intro),
 7      instructions(Lesson,Instructions),
 8      update_display(instructions, Instructions),
 9      generate_exercise(Lesson, AnsSymb),
10      completed_answer(Answer_Phrase),
11      verify_answer(Lesson, Answer_Phrase, AnsSymb, Status).

12  generate_exercise(Lesson, AnsSymb) :-
13      example(Lesson, ExS, ExA),
14      update_display(example, [ExS, ExA]),
15      exercise(Lesson, QuFS, QuB1FS, AnsSymb, Rfeatures),
16      repeat,
17      randomize_features(Rfeatures),
  $     nl, print(Rfeatures),
18      exists(fsg_prove(QuFS, QuS, [])),
19      exists(fsg_prove(QuB1FS, QuB, [])),
20      exists(fsg_prove(QuB1FS, QuB, [])),
21      update_display(exercise, [QuS, QuB]).

22  verify_answer(_, off, _, [0,0]) :- !.
23  verify_answer(_, next, _, [0,1]) :- !.
24  verify_answer(_, Answer_Phrase, AnsSymb, [1,0]) :-
25      fsg_prove(AnsSymb, Answer_Phrase, []),
26      !,
27      acknowledge('Correct!').
28  verify_answer(Lesson, Answer_Phrase, Symbol:FSR, Status) :-

Attachment C (1 of 3)
                Copyright 1987 Texas Instruments, Inc.

29      fsg_prove(Symbol:FSR, Phrase, []),              fsg_prove(Symbol:FSW, Answer_Phrase, []),
30      solution(Lesson, Symbol:Path, S1),              solution(Lesson, Symbol:Path2, S2),
31      fset_unify(FSR, Path1),                         fset_unify(FSW, Path2),
32      first_top_level_disagreement(S1, S2, FX, V1, V2),
33      !,
34      feature_index(FXN, FX),
35      acknowledge('Close!', [Phrase, Answer_Phrase, FXN, V1, V2]),
36      completed_answer(Next_Answer_Phrase),
37      verify_answer(Lesson, Next_Answer_Phrase, Symbol:FSR, Status).
38  verify_answer(_, _, AnsSymb, Status) :-
39      acknowledge('Incorrect - try again!'),
40      completed_answer(Answer_Phrase),
```

```
41      verify_answer(_, Answer_Phrase, AnsSymb, Status).

42   % ^F1first_top_level_disagreement(FS1,^F* ^F1FS2,^F* ^F1F,^F* ^F1V1,^F* ^F1V2).^F*
43   % ^F1Find first F in FS1 whose value V1 in FS1 \== its value V2 in FS2^F*

44      first_top_level_disagreement(FS1, FS2, F, V1, V2) :-
45         deref(FS1, _, (Se1)),
46         deref(FS2, _, (Se2)),
47         element_diff(Se1, Se2, (F:[V1, V2],_)).

48      element_diff((), Y, ()) :- !.
49      element_diff(X, (), ()) :- !.
50      element_diff((F:Xv,Xr), (F:Yv,Yr), (F:[Xv, Yv], Zr)) :-
51         atomic(Xv), atomic(Yv), Xv \== Yv,    % limited to atomic differences presently
52         !,
53         element_diff(Xr,Yr,Zr).
54      element_diff((F:Xv,Xr), (F:Yv,Yr), Zr) :-
55         !,
56         element_diff(Xr,Yr,Zr).
57      element_diff((Xf:Xv,Xr), (Yf:Yv,Yr), Zr) :-
58         Xf < Yf,
59         !,
```

Attachment C (2 of 3)
Copyright 1987 Texas Instruments, Inc.

```
60         element_diff(Xr, (Yf:Yv,Yr), Zr).
61      element_diff(X, (Yf:Yv,Yr), Zr) :-
62         element_diff(X, Yr, Zr).
```

Attachment C (3 of 3)
Copyright 1987 Texas Instruments, Inc.

```
%%% -*- Mode: PROLOG; Base:10.; Fonts:MEDFNB,HL12B,HL12BI -*-

% fsg-interpreter.pl - the fsg meta-interpreter.

1    :- op(1100,xfx,--->).                    % ^F2the FSG grammar    4    rule separator^F*
2    :- op(1100,xfx,:---).                    % ^F2the FSG lexicon    6    entry functor^F*
3    :- op(600,yfx,[':']).

4    fsg_prove((Goal1,Goal2), Words, Remainder) :-
5       fsg_prove(Goal1, Words, Middle),
6       fsg_prove(Goal2, Middle, Remainder).
```

```
7   fsg_prove(Feature:Goal_value, Words, Remainder) :-
8       (Feature:Head_value ---> Body),
9       fset_unify(Goal_value, Head_value),
10      fsg_prove(Body, Words, Remainder).

11  fsg_prove(Feature:Goal_value, [Word|Words], Words) :-
12      clause(Feature:Head_value, Prolog_body),
13      fset_unify(Goal_value, Head_value),
14      terminal_class(Feature, Word, Feature:Word_set),
15      fset_unify(Head_value, Word_set),
16      Prolog_body.
```

Attachment D (1 of 1)
Copyright 1987 Texas Instruments, Inc.

%-*- Mode:Prolog -*-

```
1   select_choice(Test, Choices) :-
2       var(Test), !, randomize_features(Choices).
3   select_choice(_, Choices) :- select_choices(Choices).

4   select_choices([]).
5   select_choices([Val:List|T]) :-
6       member(Val, List),
7       select_choices(T).

8   randomize_features([]).
9   randomize_features([Val:List|T]) :-
10      atomic(Val),
11      !,
12      member(Val, List),
13      randomize_features(T).
14  randomize_features([Var:List|T]) :-
15      length(List, Len),
16      eval(['RANDOM', Len], R),
17      nth(List, R, Var),
18      randomize_features(T).

19  nth([H|_], 0, H).
20  nth([_|T], N, R) :- M is N - 1, nth(T, M, R).

21  exists(G) :- G, !.
```

```
22   sound(vowel, W) :- name(W, [L|_]), member(L, "aeiou"), !.
23   sound(consonant, W).

24   %%%%%number(plural, W, PW) :- name(W, WN), append(WN, "s", 26   PWN), name(PW, PWN).

25   number(singular, third, W, PW) :- !, number(plural, W, PW).
26   number(_, _, W, W).
```

Attachment E (1 of 2)

Copyright 1987 Texas Instruments, Inc.

```
27   number(singular, W, W).
28   number(plural, mouse, mice) :- !.
29   number(plural, Atom, Plural_Atom) :-
30        name(Atom, String),
31        reverse(String, Rev_String),
32        pluralize_string(Rev_String, Plural_String),
33        name(Plural_Atom, Plural_String).

34   pluralize_string(Rev_String, Plural_String) :-
35        Rev_String = [Last_Char|_],
36        find_endings(Last_Char, Rev_String, New_String),
37        reverse(New_String, Plural_String).

38   find_endings(#/y, [_|[Penult_Char|Root]], [#/s|[#/e|[#/i|[Penult_Char|Root]]]]) :- \+
39        member(Penult_Char, "aeiou"), !.
40   find_endings(#/h, [L|[Penult_Char|Root]],   [#/s|[#/e|[L|[Penult_Char|Root]]]])  :-
41        member(Penult_Char, "cs"), !.
42   find_endings(#/s, Root, [#/s|[#/e|Root]]) :- !.
43   find_endings(#/z, Root, [#/s|[#/e|Root]]) :- !.
44   find_endings(#/x, Root, [#/s|[#/e|Root]]) :- !.
45   find_endings(#/n, [#/n|[#/a|[#/m|Root]]], [#/n|[#/e|[#/m|Root]]]) :- !.
46   find_endings(#/n, [#/a|[#/f|Root]], [#/n|[#/e|[#/f|Root]]]) :- !.
47   find_endings(#/e, [#/f|[#/i|Root]], [#/s|[#/e|[#/v|[#/i|Root]]]]) :- !.
48   find_endings(_, Root, [#/s|Root]).
```

Attachment E (2 of 2)

Copyright 1987 Texas Instruments, Inc.

%-*- Mode:Prolog -*-

% Linear Feature set unification

```
1    fset_unify(X, Y) :- var(X), !, X = Y.
```

```
2    fset_unify(X, Y) :- var(Y), !, X = Y.
3    fset_unify(XH+XS,YH+YS) :-
4         deref(XH+XS, DXH, (Xe)),
5         deref(YH+YS, DYH, (Ye)),
6         !,
7         fset_unify(DXH, DYH, Xe, Ye).
8    fset_unify(X,X).

9    fset_unify(XH, YH, Xe, Ye) :-
10        XH \== YH,                          % most common case first
11        !,
12        fset_elements(Xe, Ye, Ze),
13        XH = _+(Ze),
14        YH = XH.
15   fset_unify(_, _, _, _).

17   deref(Handle+Set, Handle, Set) :-
18        var(Handle),
19        !.
20   deref(Newer+_, Handle, Set) :-
21        deref(Newer, Handle, Set).

22   fset_elements((), Y, Y) :- !.
23   fset_elements(X, (), X) :- !.
24   fset_elements((F:Xv,Xr), (F:Yv,Yr), (F:Yv,Zr)) :-
25        !,
26        fset_unify(Xv,Yv),
27        fset_elements(Xr,Yr,Zr).
28   fset_elements((Xf:Xv,Xr), (Yf:Yv,Yr), (Xf:Xv,Zr)) :-
29        Xf < Yf,
30        !,
```

Attachment F (1 of 2)
Copyright 1987 Texas Instruments, Inc.

```
31   fset_elements(Xr, (Yf:Yv,Yr), Zr).
32   fset_elements(X, (Yf:Yv,Yr), (Yf:Yv,Zr)) :-
33        fset_elements(X, Yr, Zr).
```

% -*- Mode:Prolog -*-
% Expand FSG into Prolog (when feature sets are not a type).
:- op(1100, xfx, '::-').

Attachment F (2 of 2)
Copyright 1987 Texas Instruments, Inc.

```
expand_form((H ---> B), (EH ---> EB)) :-
    expand_fsg((H, B), (EH, EB), [], _).
expand_form((H :--- B), (EH :- EB)) :-
    expand_fsg((H, B), (EH, EB), [], _).
expand_form((H :- B), (EH :- EB)) :-
    expand_fsg((H, B), (EH, EB), [], _).
expand_form((H ::- B), (EH :- EB)) :-
    expand_fsg((H, B), (EH, EB), [], _).

expand_fsg(Var, Var, HI, HI) :- var(Var), !.
expand_fsg(Term, Term, HI, HI) :- atomic(Term), !.
expand_fsg([X|Xs], [Y|Ys], HI, HO) :- !,
    expand_fsg(X, Y, HI, HM),
    expand_fsg(Xs, Ys, HM, HO).
expand_fsg(H+S, DE, HI, [DH|HO]) :- !,
    expand_set(H+S, E, HI, HO),
    expand_deref(E, DH, DE).
expand_fsg((Se), H+(SESe), HI, [H|HO]) :- !, % need to add a handle
    expand_elements(Se, ESe, HI, HO),
    sort_elements(ESe, SESe).
expand_fsg(R is E, R is E, H, H) :- !.       % avoid '+' in arithmetic expressions
expand_fsg(Term, NewTerm, HI, HO) :-
    functor(Term, F, N),
    functor(NewTerm, F, N),
    expand_fsg_args_args(Term, N, NewTerm, HI, HO).

expand_fsg_args_args(Tuple, 0, NewTuple, H, H) :- !.
expand_fsg_args_args(Tuple, N, NewTuple, HI, HO) :-
    arg(N, Tuple, A),
    expand_fsg(A, NewA, HI, HM),
    arg(N, NewTuple, NewA),
    N1 is N-1,
    expand_fsg_args_args(Tuple, N1, NewTuple, HM, HO).

Attachment G (1 of 3)
        Copyright 1987 Texas Instruments, Inc.

expand_set(S, S, HI, HI) :- var(S), !.
expand_set(H+S, H, HI, HI) :- var(S), !, H = S.    % already expanded
expand_set(H+S, H+S, HI, HI) :-
    var(H),
    mmember(H, HI), !.
expand_set(H+(Se), EH, HI, HO) :-
    expand_elements(Se, ESe, HI, HM),
    sort_elements(ESe, SESe),
    expand_set(H, EH, HM, HO),
    fset_unify(EH, _+(SESe)).
```

```
expand_deref(S, S, S) :- var(S), !.
expand_deref(E, DH, DH+DS) :-
    deref(E, DH, DS).

expand_elements((), (), HI, HI) :- !.     % already expanded (cut is for old tail var)
expand_elements(F:V, (FN:EV, ()), HI, HO) :-
    expand_element(F:V, FN:EV, HI, HO).
expand_elements((F:V,R), (FN:EV,ER), HI, HO) :-
    expand_element(F:V, FN:EV, HI, HM),
    expand_elements(R, ER, HM, HO).

expand_element(F:V, FN:EV, HI, HO) :-
    feature_number(F, FN),
    expand_fsg(V, EV, HI, HO).

feature_number(F, FN) :-
    feature_index(F, FN),
    !.
feature_number(F, FN) :-
    retract(last_feature_index(I)),
    !,
    FN is I + 1,
    assert(last_feature_index(FN)),
    assert(feature_index(F, FN)).
feature_number(F, 1) :-
    assert(last_feature_index(1)),
    assert(feature_index(F, 1)).

Attachment G  (2 of 3)
            Copyright 1987 Texas Instruments, Inc.

sort_elements((),()).
sort_elements((X,L), M) :- sort_elements(L,N), sort_elements(X,N,M).

sort_elements(XF:XV, (AF:AV,L), (AF:AV,M)) :- AF < XF, !, sort_elements(XF:XV,L,M).
sort_elements(X,L, (X,L)).

mmember(X, [H|T]) :- X == H, !.
mmember(X, [_|T]) :- mmember(X, T).

Attachment G  (3 of 3)
            Copyright 1987 Texas Instruments, Inc.
```

What is claimed is:

1. A grammar learning aid, comprising:
   a grammar data read only memory containing data for generating grammar exercises;
   a grammar control read only memory containing instructions for generating grammar exercises, wherein said instructions unify logical variables representing features of sentences, said logical variables are of the kind found in first order predicate calculus;
   a processor for executing said instructions;
   random access memory for runtime data storage;
   an output device;
   an input device;
   an interface unit for transferring information from said grammar data read only memory and said grammar control read only memory to said output device and from said input device; and
   a system bus for communicating digital information between said processor, said random access memory, said read only memory, and said interface unit.

2. The grammar learning aid of claim 1, wherein said input device is a keyboard.

3. The grammar learning aid of claim 1, wherein said output device is a visual display.

4. The grammar learning aid of claim 1, wherein said data of said grammar data read only memory is in a logic programming language.

5. The grammar learning aid of claim 4, wherein said instructions of said grammar control read only memory further comprise a meta interpreter for said grammar rules.

6. The grammar learning aid of claim 1, wherein said grammar control read only memory further contains instructions for providing feedback to the user in response to a feature associated with an erroneous answer.

7. The grammar learning aid of claim 1, and further comprising a DC power supply.

8. The grammar learning aid of claim 4, and further comprising a language interpreter read only memory containing instructions for executing said grammar data and said grammar control instructions as virtual machine instructions.

9. A processor system programmed to generate grammar lessons for use with a computer system, comprising:
   a grammar data read only memory containing data for generating grammar exercises;
   a grammar system and control read only memory containing instructions for generating grammar exercises, wherein said instructions unify logical variables representing features of sentences, said logical variables are of the kind found in first order predicate calculus;
   a processor for executing said instructions;
   random access memory for runtime data storage and
   a processor bus for communicating digital information between said processor, said random access memory, and said read only memory.

10. The processor system of claim 9, wherein said data of said grammar data read only memory is in a logic programming language.

11. The processor system of claim 10, wherein said instruction of said grammar control read only memory further comprise a meta interpreter for said grammar data.

12. The processor system of claim 9, wherein said grammar control read only memory further contains instructions for providing feedback to the user in response to a feature associated with an erroneous answer.

13. The grammar learning aid of claim 10, and further comprising a language interpreter read only memory containing instructions for executing said grammar data and said grammar control instructions as virtual machine instructions.

14. A method of using a computer to teach grammar, comprising the steps of:
   generating a correct sentence, using a lexicon that defines said sentence in terms of features;
   generating an exercise derived from said correct sentence;
   interrogating said user with said exercise;
   receiving input from said user, said input representing an answer to said exercise;
   verifying said answer by associating its features with features of said correct sentence; and
   providing feedback to said user in response to said verification step.

15. The method of claim 14, wherein said step of generating a sentence comprises unifying a set of features to said grammar data.

16. The method of claim 14, wherein said step of generating a sentence comprises randomizing said features.

17. The method of claim 14, wherein said step of generating an exercise comprises unifying a set of features, which has a blank substituted for the feature that is the subject of the exercise, to said grammar data.

18. The method of claim 14, wherein said step of verifying said answer comprises substituting said answer into said exercise and determining whether the result parses through the features of said correct sentence.

19. The method of claim 14, wherein said step of providing feedback to the user comprises determining a feature associated with an error in said answer and using said feature in said step of generating a sentence.

* * * * *